United States Patent
Storey et al.

(10) Patent No.: US 11,012,153 B2
(45) Date of Patent: *May 18, 2021

(54) OPTICAL TEST DEVICE AND SYSTEMS

(71) Applicant: LEVEL 3 COMMUNICATIONS, LLC, Broomfield, CO (US)

(72) Inventors: Jeffrey K. Storey, Boulder, CO (US); John F. Waters, Boulder, CO (US); Andrew Dugan, Superior, CO (US); Salvador Paredes, Broomfield, CO (US); Gary Ratterree, Louisville, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,813

(22) Filed: Sep. 25, 2018

(65) Prior Publication Data
US 2020/0099445 A1    Mar. 26, 2020
US 2020/0350987 A9    Nov. 5, 2020

Related U.S. Application Data

(63) Continuation of application No. 15/615,808, filed on Jun. 6, 2017, now Pat. No. 10,084,539, which is a
(Continued)

(51) Int. Cl.
*H04B 10/079* (2013.01)
*G02B 6/293* (2006.01)
*H04B 10/035* (2013.01)

(52) U.S. Cl.
CPC ..... *H04B 10/0793* (2013.01); *G02B 6/29361* (2013.01); *H04B 10/035* (2013.01); *H04B 10/0791* (2013.01); *H04B 10/07955* (2013.01)

(58) Field of Classification Search
CPC .............. H04B 10/0793; H04B 10/035; H04B 10/0791; H04B 10/07955; G02B 6/29361
See application file for complete search history.

(56) References Cited

U.S. PATENT DOCUMENTS 5,978,113 A * 11/1999 Kight ..................... H04B 10/00
370/907
6,522,434 B1 * 2/2003 Jennings .............. H04B 10/077
398/16
(Continued)

FOREIGN PATENT DOCUMENTS

WO    WO-200101725 A1    1/2001
WO    WO-2013075107    5/2013

OTHER PUBLICATIONS

Canadian Examination Report, dated Aug. 13, 2018, Application No. 2,854,359, filed Nov. 19, 2012; 3 pgs.
(Continued)

*Primary Examiner* — Mina M Shalaby

(57) ABSTRACT

Systems, methods, and devices are disclosed for monitoring optical communications between a managed location and a remote location. In particular, an optical signal is transmitted over an optical fiber and passed-through a test device. A portion of the optical signal is filtered from the original optical signal and passed to a monitoring unit. The monitoring unit may instruct one or more switches in the test device to loop the optical signal back toward the managed location. Subsequently, testing and monitoring may be performed at the managed location. The device may provide a test output or may transmit the information to the managed location.

20 Claims, 10 Drawing Sheets

Related U.S. Application Data continuation of application No. 15/263,169, filed on Sep. 12, 2016, now Pat. No. 9,673,896, which is a continuation of application No. 14/834,320, filed on Aug. 24, 2015, now Pat. No. 9,584,219, which is a continuation of application No. 13/591,406, filed on Aug. 22, 2012, now Pat. No. 9,118,414, which is a continuation of application No. 13/590,922, filed on Aug. 21, 2012, now Pat. No. 8,417,114.

(60) Provisional application No. 61/561,641, filed on Nov. 18, 2011, provisional application No. 61/670,531, filed on Jul. 11, 2012, provisional application No. 61/670,526, filed on Jul. 11, 2012.

(56) References Cited

U.S. PATENT DOCUMENTS

| | | | | |
|---|---|---|---|---|
| 6,583,867 B1* | | 6/2003 | Jennings | H04B 10/071 356/73.1 |
| 6,708,004 B1 | | 3/2004 | Homsey | |
| 6,798,944 B2* | | 9/2004 | Pfeiffer | H04B 10/075 385/16 |
| 6,807,370 B2* | | 10/2004 | Harasawa | H04B 10/07 398/11 |
| 7,103,275 B2* | | 9/2006 | Fujiwara | H04B 10/0771 398/173 |
| 7,310,135 B2* | | 12/2007 | Wisseman | H04B 10/00 356/73.1 |
| 7,394,981 B2* | | 7/2008 | Manifold | H04J 14/025 398/17 |
| 7,437,070 B2* | | 10/2008 | Fujieda | H04B 10/0777 359/333 |
| 7,565,079 B2 | | 7/2009 | Simanonis et al. | |
| 7,599,618 B2* | | 10/2009 | Adam | G01J 1/04 398/10 |
| 7,809,279 B2* | | 10/2010 | Zhang | H04B 10/035 398/177 |
| 7,881,616 B2* | | 2/2011 | Hahin | H04B 10/66 398/137 |
| 7,995,598 B2* | | 8/2011 | Astigarraga | H04B 10/035 370/419 |
| 8,005,358 B2* | | 8/2011 | Zhang | H04B 10/0775 398/16 |
| 8,036,526 B2* | | 10/2011 | Bogoni | H04B 10/03 398/1 |
| 8,417,114 B1* | | 4/2013 | Storey | G02B 6/29361 398/16 |
| 8,687,957 B2* | | 4/2014 | Perron | H04B 10/0795 398/25 |
| 8,948,005 B1* | | 2/2015 | Gert | H04B 10/07 370/229 |
| 9,002,201 B2* | | 4/2015 | Benner | H04B 10/073 398/38 |
| 9,203,512 B2* | | 12/2015 | Xia | H04B 10/0771 |
| 9,584,219 B2 | | 2/2017 | Storey et al. | |
| 9,680,569 B2* | | 6/2017 | Archambault | H04B 10/07955 |
| 10,148,348 B2* | | 12/2018 | Yadlowsky | H04B 10/03 |
| 10,284,584 B2* | | 5/2019 | Hu | G06F 21/552 |
| 10,288,524 B2* | | 5/2019 | Leclerc | G01M 11/3136 |
| 10,313,181 B2* | | 6/2019 | Lockyer | H04L 41/04 |
| 10,371,596 B2* | | 8/2019 | L'Heureux | G01M 11/3136 |
| 10,620,250 B2* | | 4/2020 | Varel | G01R 29/0878 |
| 2002/0015200 A1 | | 2/2002 | Jennings et al. | |
| 2006/0127086 A1* | | 6/2006 | Frankel | H04B 10/298 398/19 |
| 2007/0016835 A1* | | 1/2007 | Hronik | G01R 31/31718 714/727 |
| 2007/0098403 A1* | | 5/2007 | Simanonis | H04J 3/14 398/45 |
| 2013/0129344 A1 | | 5/2013 | Storey et al. | |
| 2016/0028476 A1 | | 1/2016 | Storey et al. | |
| 2016/0380695 A1 | | 12/2016 | Storey et al. | |
| 2017/0272153 A1 | | 9/2017 | Storey et al. | |

OTHER PUBLICATIONS

Extended European Search Report, dated May 19, 2015, Application No. 12850232.5, filed Nov. 19, 2012; 8 pgs.
International Preliminary Report on Patentability, dated May 20, 2014, Int'l Appl. No. PCT/US12/065869, Int'l Filing Date Nov. 19, 2012; 10 pgs.
International Search Report, dated Feb. 7, 2013, Int'l Appl. No. PCT/US12/065869, Int'l Filing Date Nov. 19, 2012, 3 pgs.
Written Opinion, dated Feb. 7, 2013, Int'l Appl. No. PCT/US12/065869, Int'l Filing Date Nov. 19, 2012, 8 pgs.

* cited by examiner

OPTICAL TEST DEVICE AND SYSTEMS

CROSS-REFERENCE TO RELATED APPLICATION

The present application is a continuation application claiming priority to U.S. patent application Ser. No. 15/615,808 entitled "OPTICAL TEST DEVICE AND SYSTEMS," filed Jun. 6, 2017, which is a continuation of Ser. No. 15/263,169 entitled "OPTICAL TEST DEVICE AND SYSTEMS," filed Sep. 12, 2016, now U.S. Pat. No. 9,673,896, which is a continuation of U.S. patent application Ser. No. 14/834,320 entitled "OPTICAL TEST DEVICE AND SYSTEMS," filed Aug. 24, 2015, now U.S. Pat. No. 9,584,219, which is a continuation of U.S. patent application Ser. No. 13/591,406 entitled "APPARATUS, SYSTEM AND METHOD FOR NETWORK MONITORING," filed Aug. 22, 2012, now U.S. Pat. No. 9,118,414, which is a continuation of U.S. patent application Ser. No. 13/590,922 entitled "APPARATUS, SYSTEM AND METHOD FOR NETWORK MONITORING," filed Aug. 21, 2012, now U.S. Pat. No. 8,417,114, which claims priority to U.S. Provisional Application Nos. 61/561,641 entitled "SYSTEMS AND METHODS FOR NETWORK MONITORING," filed on Nov. 18, 2011, 61/670,531 entitled "APPARATUS, SYSTEM AND METHOD FOR NETWORK MONITORING," filed Jul. 11, 2012, and 61/670,526 titled "Apparatus, SYSTEM AND METHOD FOR NETWORK MONITORING," filed Jul. 11, 2012, all of which are hereby incorporated by reference herein.

TECHNICAL FIELD

Aspects of the present disclosure relate to optical communication networks, and in particular, methods and systems for monitoring optical signals in an optical communication network.

BACKGROUND

Optical communication networks often require monitoring and testing of the various fiber links and/or optical pathways that make up the optical network to ensure the validity, continuity, and status of such fiber links and pathways. For example, optical links require monitoring to detect disconnections, physical breaks, and faults so that corrective action can be taken. It is often the case that service providers must install expensive equipment, such as termination equipment, at a customer's site to monitor its optical network links and fibers. Alternatively, optical network service providers may dispatch a maintenance crew to a customer's location for testing and monitoring purposes, which is both expensive and time-consuming.

U.S. Pat. No. 7,778,554 describes a cost-effective way to monitor optical network links. Generally speaking and referring to FIG. 1 of the '554 patent reproduced here as FIG. 1 (prior art), the technology discussed in the '554 patent involves over-coupling an amplitude modulated signal onto a transmission line 1, such as on a transmission fiber 3, emanating from a first end of the transmission line at a transmitter/receiver device 7. At a second end of the transmission link, the small amplitude modulated portion of the overall signal on the transmission line is then returned to the first end of the transmission line along a receive fiber 5. The second end of the transmission line includes two coupling elements (13,15) that collectively remove the small amplitude modulated signal from the transmit line and then superimpose the amplitude modulated signal on the receive line for return to the transmitter/receiver 7 at the first end of the transmission link. A detector device 11 then compares the small signal to a threshold to determine if the received signal level is too low.

Notably, the solution set out in the '554 patent can only determine if there is an error in the entirety of the path to and from the originating end of the transmission line. Stated differently, because the signal is only monitored for an error at the originating end of the path, the signal must traverse both the transmit and the receive paths and there is not a way to isolated those paths. Hence, there is no mechanism whereby an error can be isolated to the transmit line or the receive line. Moreover, there is no mechanism to determine the signal strength at the receiving end and thus only of the transmit line. It is with these observations in mind, among others, that various aspects of the present disclosure were conceived and developed.

SUMMARY

One aspect of the present disclosure involves an optical test device apparatus including at least one optical filter coupled with a first optical fiber. The first optical filter is configured to allow an optical signal on the first optical fiber to pass from the first optical fiber to a second optical fiber. The optical test device further includes at least one monitoring device coupled with the at least one optical filter. The monitoring device is configured to receive a portion of the optical signal to test the optical signal. The optical test device includes a first switch in communication with the first optical fiber. The switch is configured to switch the optical signal on the first optical fiber to a third optical fiber for loop-back testing. Finally, the monitoring device is further configured to detect a signal and toggle the switch to switch the optical signal on the first optical fiber to the third optical fiber when the signal is detected.

Aspects of the present disclosure may also involve a testing method including the operations of receiving an optical signal at an optical test device, which may include at least one monitoring device and a first switch. The method may further include receiving, at the monitoring device, a portion of the optical signal to test the optical signal, and altering the state of the optical test device from a first state (e.g., pass through) to a second state (e.g., loop back) when a signal is detected at the optical device.

Yet another aspect of the present disclosure involves an optical system including anoptical test device. The optical test device includes a first optical filter coupled with a first optical fiber. The first optical fiber carries a test signal on at least one wavelength carried by the first optical fiber. The filter is configured to allow the test signal to pass from the first optical fiber to a second optical filter of the optical test device. The second optical filter is configured to place the test signal on a second optical fiber. The system further includes a network device coupled with the second optical fiber. The network device includes a third filter configured to receive the test signal if it is present on the second optical fiber, and determine a characteristic of at least one of the first optical fiber or the second optical fiber.

Finally, aspects of the present disclosure also include a method of testing an optical connection between devices. The method, in one possible implementation, includes the operation of receiving, at a remote device, a test signal on a particular wavelength of a plurality of wavelengths carried by a first optical fiber. The method further includes returning the test signal on a second optical fiber where the test signal is returned on the particular wavelength. Finally, the method includes determining a characteristic of at least the first optical fiber or the second optical fiber at a second device.

These and other aspects of the present disclosure are discussed in more detail below with reference to the accompanying drawings.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters refer to the same parts throughout the different views.

DETAILED DESCRIPTION

Figure 1:
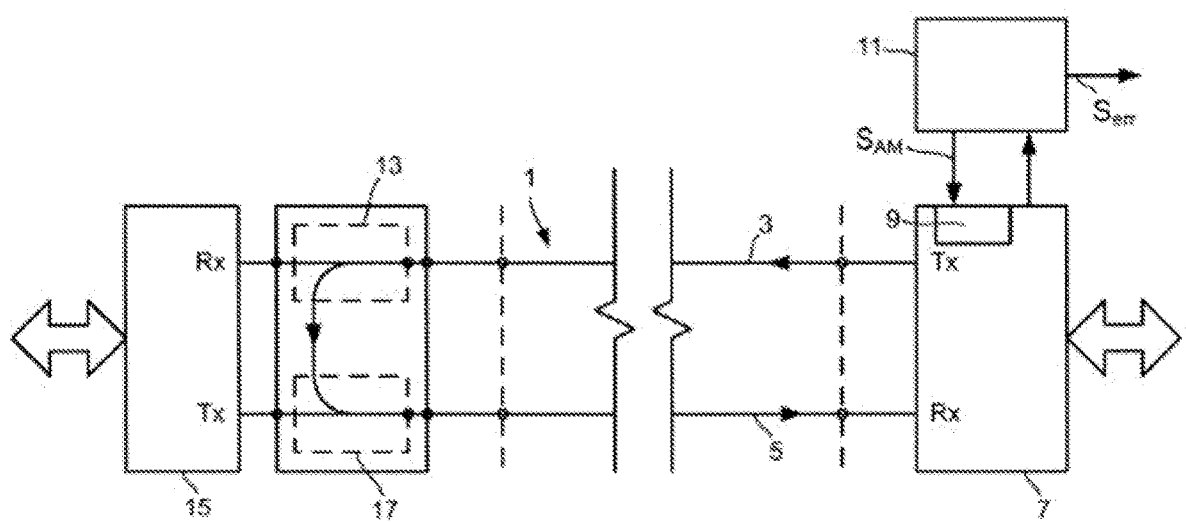
FIG. 1 (Prior Art) is an example of a conventional test device

The present disclosure describes methods and systems for monitoring and testing optical connections and/or optical fibers in an optical communication network. In various implementations, a cost-efficient optical test device and system is described that enhances the ability to test and monitor optical network connections, optical signals, and/or optical fiber links, among other capabilities. In one configuration, the device is discrete, cost effective, and may be employed and operated locally or remotely without the need for more costly and sophisticated on-site equipment, or without the need for access to the customer's equipment.

The use of optical technologies in communication networks is extensive because of their high speeds and the ability to transmit large amount of data. Generally speaking, an optical communication network involves optical fibers, such as thin flexible glass filaments, through which data can be transmit in the form of light, over long distances between various types of computing equipment, such as web servers, routers, telecommunication devices, voice over IP (VOIP) devices, processing devices, and the like. By using techniques such as wavelength-division multiplexing to modulate data on different wavelengths (colors) of light on any given fiber it is possible to carry 40 or more different channels of data on a fiber. Additionally, in contrast to copper or other metal cables, optic fibers can carry data at higher frequencies and over longer distances with less attenuation and interference. As the use of such networks become more ubiquitous, there arises a need to monitor and test various fiber links and/or optical pathways that make up the optical network to ensure the validity and continuity of the transmitted data. Typically it is the responsibility of the optical network providers to ensure that data transmission is uninterrupted, or if any faults are detected to take appropriate corrective measures to resolve any of the data transmission related issues. Currently, most of the monitoring and testing is done by dispatching a maintenance crew to a customer's location, which can be both expensive and time consuming. Thus there is a need for a more cost effective and time efficient method for performing these operations. In particular there is a need for a monitoring and testing the optical communication network without the need for a sophisticated on site equipment or even without the need to access customer equipment.

Optical network service providers sell a variety of optical communication services to business, enterprises, carriers, data host centers, and/or other customers. In order to provide such services to customers, an optical connection between the customer and the optical network is typically required. When such a network service provider is operating a data network including high speed and high bandwidth optical network equipment and fibers, the optical connection to the customer provides the customer with access to the network service provider's network. Such a connection may be accomplished in a variety of ways. For example, a network service provider may provide access to the optical network by extending optic fibers to a customer and installing specialized equipment on-site at the customer's location, such as optical termination equipment. In another example, the service network provider may extend optical cable(s) directly into a customer's proprietary equipment, such as an optical router, to provide optical services to the customer without the need of additional equipment.

While all such techniques may successfully allow access to the optical network, it is more cost-efficient to avoid installing equipment at a customer location. In addition to the capital cost of the equipment, equipment located at customer location involves maintenance and service costs, equipment upgrade and software upgrade costs, as well as other costs. Avoiding such costs would have many advantages. Moreover, installing equipment at a customer location could potentially become a failure point, which if eliminated would likely increase overall reliability of an optical connection.

However, when a network service provide connects an optical fiber to a customer's proprietary equipment, it may be more difficult to test and/or monitor any optical links and/or fibers extended to the customer because customers often prohibit or restrict access to their equipment. For example, a customer may restrict access to its optical router that is connected to a network service provider's optical fiber. Without access to the customer's equipment, the optical network service provider cannot directly or efficiently monitor any optical signals sent to the customer. Aspects of the present disclosure, provide network service providers the ability to test and monitor any optical connections, optical fibers, and/or optical links the network service provider has provided to a customer when no equipment has been installed at the customer's location.

The optical test device, in one possible implementation, is configured to monitor the integrity of optical connections and fibers during normal operation, and to enter a loop-back state, for additional testing as well as to detect and isolate faults in the optical pathway between various possible network devices. More specifically, during normal operation, the optical signal is allowed to directly pass through the optical test device. On the other hand, in the loop-back state, the optical signal is diverted back to the service provider device, in order to conduct high additional testing on the optical signal and pathways.

FIG. 1 illustrates an example of an optical communication network 100 in which optical links, connections, and/or fiber optic cables provided between an optical network service provider's device 104 (or other devices) and a variety of possible customer devices 108 can be monitored and tested by an optical test device 104 conforming to aspects of the present disclosure. An optical communication network is a data network built on or that otherwise includes fiber optics technology that allows electronic devices, such as telephones and computers, to communicate by transmitting data in the form of light over connected optical fibers and optical links. An optical link generally describes a communication link that involves a single end-to-end optical circuit and typically includes one or more optical fibers that transmit and receive optical signals. While not illustrated, an optical network will typically include numerous optical links and many different types of networking equipment involved in the transmission, management, storage, and processing of data between companies.

According to one aspect of the current disclosure, the optical communication network 100 includes an optical network service provider device 102 that represents a device and/or devices that provide Internet services, telecommunication services, and/or other types of computing and communication services to customers through an optical communication network. For example, the network service provider device 102 may be a web server that hosts and serves content accessible by a customer computer connected to the Internet. As another example, the network service provider device 102 may be a network device providing high speed Internet access to customers. In yet another example, the network service provider device 102 may provide VOIP services to a customer.

In another aspect, the optical network service provider device 102 may be any type of optical communication device capable of providing an optical signal to a customer device 108. For example, the optical network service provider device 102 may include optical transmitters, receivers, transceivers, lasers, and/or couplers, and/or some combination thereof. Other types of optical fiber and/or optical components may also be included in the optical network service provider device 102 and it is contemplated that any type of optical components capable of providing an optical signal, optical communications link, and/or optical communication to a customer device 108 may be included in the optical network service provider device 102.

The optical network service provider device 102 sends an optical signal to the customer device 108 along a transmitting optical fiber 106, which may be a single optical fiber, or a multi-mode fiber. Additionally, the network service provider device 102 receives optical signals from the customer device 108 along a receiving fiber 109, which also may be a single optical fiber or multi-mode fiber. While FIG. 1 illustrates the optical communication network 100 having a transmitting optical fiber (i.e. Tx fiber 106) and a receiving optical fiber (i.e. Rx fiber 109), the optical communication network depicted in FIG. 1 may also be implemented using optical fibers capable of both transmitting and receiving optical signals at the customer device 108 and the optical network service provider device 102.

The customer device 108 may be a processing device, a communication device, or the like, such as a computer, a server computer, a network device, and/or a mobile communication device that includes optical components, such as optical transmitters, optical receivers, and/or optical couplers. The customer device 108 is operatively connected to the Tx fiber 106 and the Rx fiber 109 and is capable of receiving and transmitting optical signals using such fibers. For example, the customer device 108 may be a router, such as an optical router, capable of connecting to a fiber optic cable provided by the optical network service provider.

The optical test device 104 may be connected within any fiber optic link between the optical network service provider device 102 and the customer device 108 to facilitate the testing and/or monitoring of optical signals, optical fibers, and/or other optical connections between a network service provider and a customer. In one possible arrangement, the optical test device 104 provides an interface between the optical fibers connecting the customer and the service provider equipment. Hence, rather than being directly connected to the customer device 108, fibers from the network service provider device 102 are connected to the optical test device 104. From the optical test device 104, which may be proximate to a customer device, one or more optical links are then connected to the customer device 108. In one possible arrangement, as shown in FIG. 1, transmit and receive fibers 106A and 109A from the network service provider device 102 are connected with a first logical side of the optical test device 104 and transmit and receive fibers 106B and 109B are connected with a second logical side of the optical test device 104. Alternatively, the optical device may be integrated within the provider device 102. Thus, while in one possible implementation, the device 104 is a stand alone device between the provider device and the customer device, the test device may be integrated in other equipment or otherwise provided at some point between along fiber paths between devices.

In a normal mode of operation, the optical signals from the network service provider device 102 pass directly through the optical test device 104 to the customer device 108, with only a basic monitoring of the integrity of the links being performed. Thus, when the optical test device is in the normal mode of operation the transmit and receive fibers 106A and 109A are connected, through the test device, directly with the transmit and receive fibers 106B and 109B, such that optical transmissions proceed unhindered and uninterrupted between the network service provider and the customer.

Additionally, the optical test device 104 may be configured to control when the optical signals pass through the optical test device 104 or when the optical test device 104 facilitates monitoring and testing of the optical fiber links. For example, the optical test device 104 may be configured to change to a loop-back state during which optical signals, such as an optical signal received from the network service provider device 102, no longer pass through the optical device 104, but are rather looped back to the optical signal originating from the network service provider device 102 allowing testing and monitoring of any fibers connecting the network service provider to the customer.

The process of "loop-back" discussed herein involves routing signals, such as optical signals, from an originating source along some path and back to the originating source without substantially modifying the signal. In one possible implementation, the optical test device may enter a loop-back state, upon detection of a control signal, where an optical transmission path to the test device is switched or otherwise connected to an optical return path from the optical test device. In such a state, an optical signal on the transmission path is looped back on the return (or receive) path rather than be transmitted through the optical device. For example, any optical signals originally transmitted from an upstream location, such as the network provider, to a downstream location, such as a customer, will be looped back toward the upstream location. Looping the optical signal back to the originating location allows for various tests to be performed on the looped optical signal, such as verifying optical signal continuity, and allows those tests to be performed from a remote location.

Figure 2:
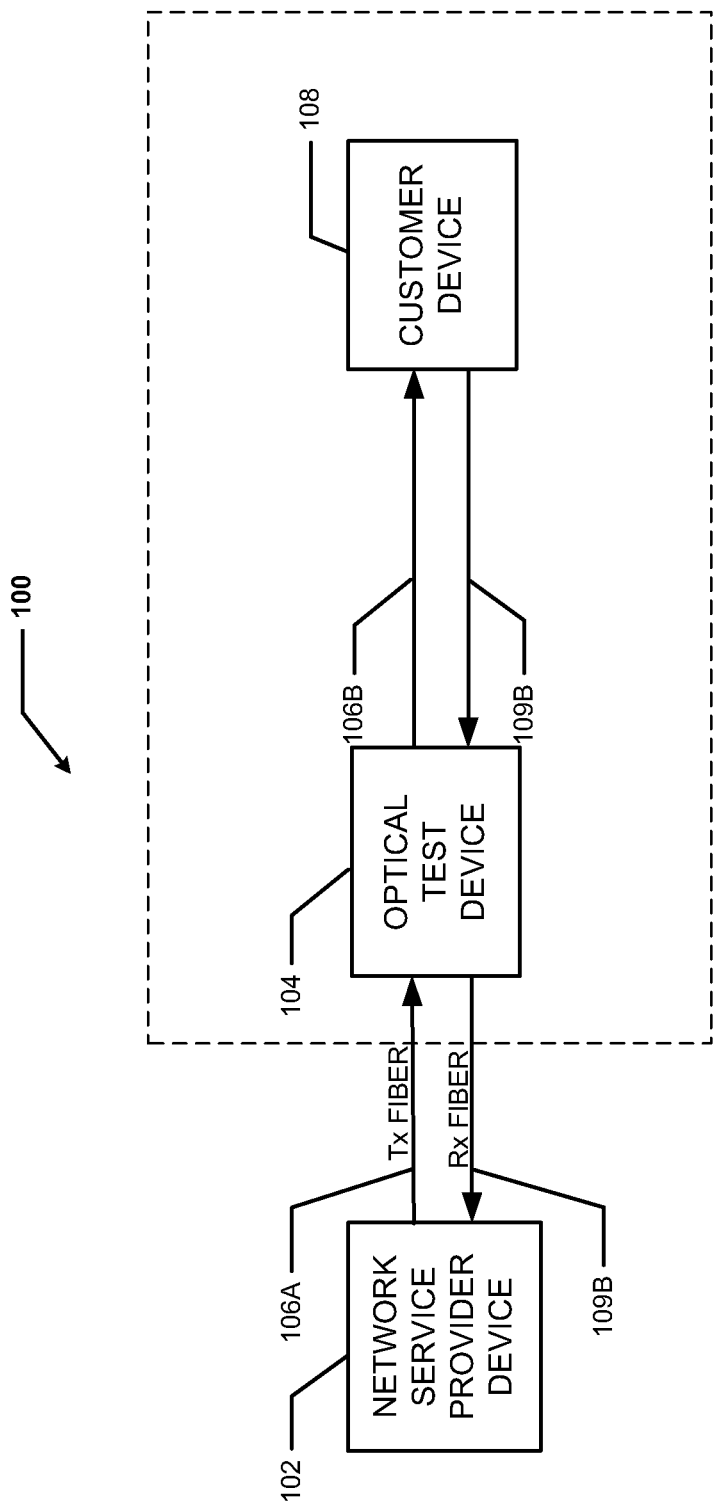
FIG. 2 is a block diagram illustrating an optical test device in an optical communication network, in accordance with an embodiment of the present disclosure.

FIGS. 2A and 2B illustrate two possible implementations of an optical test device conforming to aspects of the present disclosure. The various components of the optical test device 104 transmit optical signals to the customer device 108 as well as analyze optical signals to determine whether the optical signals are valid or invalid. Additionally, the various components of the optical test device 104 may be used to change the state of the optical test device 104 from its default pass through state (normal state) to a loop-back state, which allows a network service provider to conduct high-level tests of optical fibers, optical links, and/or the likes extending between the network service provider device 102 and the customer device 108.

According to one aspect of the current disclosure, the optical test device 104 may receive an optical signal from the network service provider device 102 and transmit the optical signal to a filter 202. Alternatively, the optical device 104 may receive an optical signal from the customer device 108 and transmit the signal to a filter 204. The filters 202 and 204 are optical filters that receive optical signals. Generally, optical filters selectively transmit portions of light from an optical signal having certain properties, such as a particular range of wavelengths, while blocking the remainder. Optical filters may be used for multiplexing and demultiplexing, routing, attenuating, encoding, and/or decoding optical signals. The filters 202 and 204 selectively pass or divert a portion of the optical signal, referred to as a test portion, to monitors 208 and/or 210 respectively, and allow the remaining portion of the optical signal to continue transmitting through the optical test device 104. For example, the filter 202 may filter a percentage of the power of the optical signal (measured in decibels referenced to a milliwatt (dBm) and/or Watts) and pass it to the monitor 208 while allowing the remainder of the optical signal to continue transmitting through the optical test device to the customer device 108. Similarly, filter 204 may direct a portion of an optical signal received on Rx Fiber 109B to the monitor 210 and allow the remainder of the optical signal to continue transmitting through the optical test device to the service provider device 102.

In one embodiment, filters 202 and 204 may be an interference, a dichromic, or other filter type that selectively pass a portion of the optical signal to the monitor 208 and 210 respectively. An interference filter or dichroic filter is an optical filter that reflects one or more spectral bands or lines and transmits others (e.g. reflects a particular red wavelength of light and transmits a particular green wavelength of light), while maintaining a nearly zero coefficient of absorption for all wavelengths of interest. An interference filter may be a high-pass, a low-pass, a bandpass, or a band-rejection filter that designates different wavelengths of light.

The monitors 208 and 210 represent computing and/or processing devices that include one or more processors and are configured to receive optical signals, optical data and/or other communications from the filters 202 and 204. The monitors may include dedicated circuit components, a programmable logic controller, and application specific integrated circuit, a processor or other device. The monitors 208 and 210 determine, in one specific implementation, whether the optical signal is valid or invalid, or whether there is a signal or no signal, and provide some indication thereof. For example, the monitor 208 and 210 may determine whether a signal is present on the fiber. The transmit monitor 208 measures the power level of the incoming input signal as a percentage of the expected power level, in one example. The transmit monitor may include a light detector, optical sensor, photo detector, photo diode, or other components that can detect and measure optical signals on the fibers, and particularly measure the power level of the signal.

Additionally, the monitors 208 and 210 may analyze the power level of the test portion of the optical signal received from the filter 202 and/or filter 204 to determine the validity of the overall optical signal. Typically, optical signals are transmitted at different wavelengths with differing power level outputs. The power level of an optical signal is generally based on the signaling source used to provide the optical signal. For example, high-power lasers may be used to drive optical signals at correspondingly high power levels. Over time the power level of the signaling source (e.g. the laser) can decrease, causing the optical signal power output to decrease. The monitors 208 and 210 may measure the power level of the test portion of the optical signal and compare it to a power level threshold stored in the monitoring device, to determine whether the original optical signal is valid. When the power level of the test portion of the optical signal is below an acceptable power level threshold, the optical signal is considered invalid. In contrast, when the measured power level of the test portion of the optical signal is above the power level threshold, the optical signal is considered valid. For example, the monitoring device may have an established power level threshold range indicating that an optical signal with a power level above 0 dBm (1 milliWatt) is considered valid and an optical signal with a power level below −50 dBm is considered invalid. Thus, if the optical test device 104 measures the power level of the test portion of the optical signal at 1 dBm or greater, the optical test device 104 will provide an indication that the optical signal, as well as the entirety of the optical fiber and/or optical connection, is valid.

Besides identifying a fiber with a low or no signal, the optical test device 104 may also help identify overly high power level of the test portion of the optical signal. Being able to identify optical signals with power output levels that are too high is important, as high power levels may cause problems such as over saturation of optical receivers. Thus, in such an implementation, the optical test device, and particularly the monitor, may include an upper threshold that when exceeded causes an error indication. Abnormally high power levels may be caused when a laser's launch power is too high or a higher power laser than specified is deployed for a given length of fiber, which can both over saturate the optical receivers at the customer equipment.

In one possible implementation, the optical test device includes one or more light emitting diodes (LED(s)), or other forms of visual indication tied to the signal strength and/or the threshold values. For example, if a valid signal exists, the monitors 208 and 210 may illuminate one or more of the LED(s), 216, 218, 220 operatively coupled to the optical test device 104. Hence, for example, when the signal strength is greater than 1 milliWatt a green light may be illuminated and should the signal fall below 1 milliWatt (e.g. below −50 dBm) a red light is illuminated.

In yet another example, the monitors 208 and 210 may identify the optical signal as strong, average or weak, and subsequently illuminate the one or more LEDs 216, 218, 220 operatively coupled to the optical test device 104. In such an implementation, the proper operating range of the optical signal may be defined, with visual indicators illuminated when the test portion of the optical signal falls within a predefined portion of the range. For example, if the proper operating range is 1 dBM to 9 dBM, the device may be configured with thresholds corresponding to ranges falling between 1 and 3 dBM (weak), 4 and 6 dBM (average), and 7 and 9 dBM (strong). Thus, when the optical signal is measured as falling within one of the predefined ranges a corresponding indication is provided. While the device is discussed as having LEDs, it is also possible to include a single multi-color LED, other lighting types, or a liquid crystal display, which may provide more detailed information including the actual measured power level. Other mechanisms that are capable of conveying information on the monitoring and/or test status can also be implemented or information can be transmitted to a remote or centralized location for further processing.

According to another aspect of the current disclosure, the monitors 208 and 210 may process the portion of the optical signal from the filter 202 or filter 204 to detect a signal indicating that the optical test device 104 should trigger the switches 212 and 214 to change from a pass-through state to a loop-back state. For example, when a connection issue is identified by the monitor (e.g. a power level falling below a power threshold), a signal may be transmitted to the test device to enter the loop-back state. For example, the monitor 208 may detect a signal encoded within the optical signal received over the Tx fiber 106. The encoded signal may originate from the device shown in FIG. 4A (discussed herein) or may originate from any number of conventional network components suitable to generate a digital or an optical signal.

In one aspect, the encoded signal may be a digital sequence, such as a predetermined series of bits represented by a series of digital zeros ("000000") and/or a series of digital ones ("111111") for a predetermined amount of time, such as a three seconds. The encoded signal may also include header and tail information as necessary to transmit the encoded signal through the network. Other types of encoded signals may also be detected. In one implementation, an encoded signal is transmitted on one or more of the fibers connected with the optical test device 104 and the monitor 208 is configured to identify the encoded signal. For example, the monitor 208 may be programmed with or otherwise include a reference signal, and be capable of detecting a match. When the encoded signal is identified, the optical test device 104 will automatically change to a loop-back state and begin looping any optical signals sent from the network service device 102 back to the network service device 102 allowing additional testing and monitoring of the optical link connected with the test device without additional equipment installed at the customer's location.

The optical test device enters the loop-back state when the monitors 208 and 210 detect a signal encoded within the optical signal or the device otherwise is commanded to enter the loop-back state, which directs the switches 211 and 214 to be toggled. The switches 212 and 214 are toggled from a first position, which corresponds to a normal state in which any optical signal sent over the Tx fiber 106 simply passes through the optical test device 104 to the customer device 108, to a second position, where any optical signals sent over the Tx fiber 106 loop-back through the optical test device 104 to the optical network service provider device 102 by way of the Rx fiber 109. Thus, after the optical device 104 is placed in a loop-back state, an optical signal sent over the Tx fiber 106 will pass from the filter 204 to the switch 210, down the optical loop-back path 107, to the switch 212 and pass over the Rx fiber 109A back towards the network service provider device 102. The switches 212 and 214 may be mechanical switches, electronic switches, such as relays, optical switches, and/or any other type of switch. Once the optical test device 104 is in a loop-back state, various tests, such as high-level tests, packet-level tests, and light-level tests may be conducted to determine the health and status of the optical signal and/or optical services being provided.

Besides entering a loop-back state in response to an encoded signal, the device may also be configured with a manual switch 222 or switches to change between a pass through state/normal state and a loop-back state. Various possible implementations may be configured to enter a loop-back state in response to an encoded signal, a signal from a manual switch or switches, as well as other possible means.

The optical test device 104 may be returned to its normal, non-test, operational pass-through state when testing and monitoring of any optical signals and/or optical services provided by the network service provider is complete. In addition, the optical test device 104 may be configured to return to the pass through state in case of its failure. For example, should the optical device 104 lose power, the switches 212 and 214 will return to the pass-through position and/or closed state.

Figure 3A:
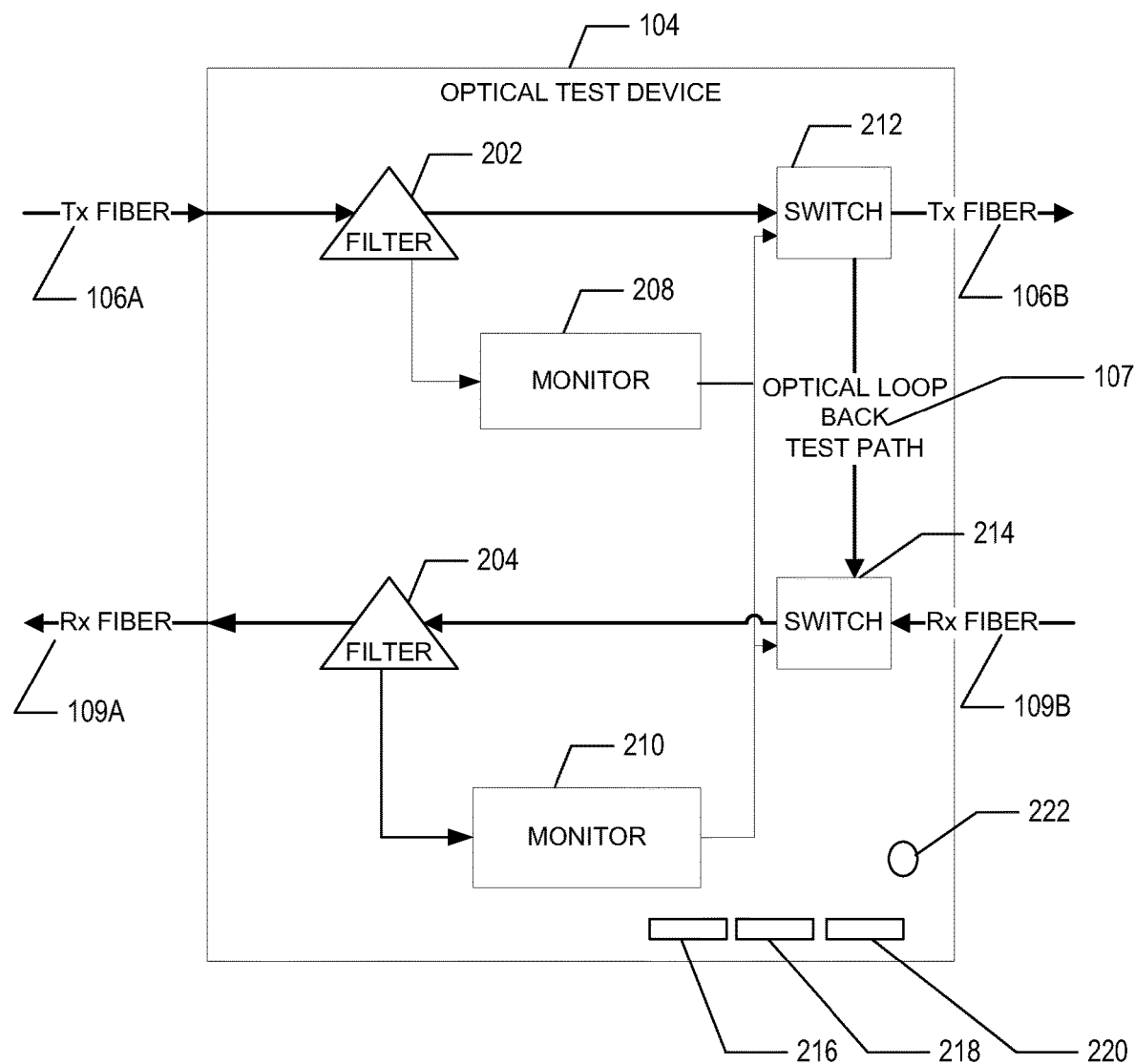
FIG. 3A is block diagram illustrating an example of an optical test device, in accordance with an embodiment of the present disclosure.
Figure 3B:
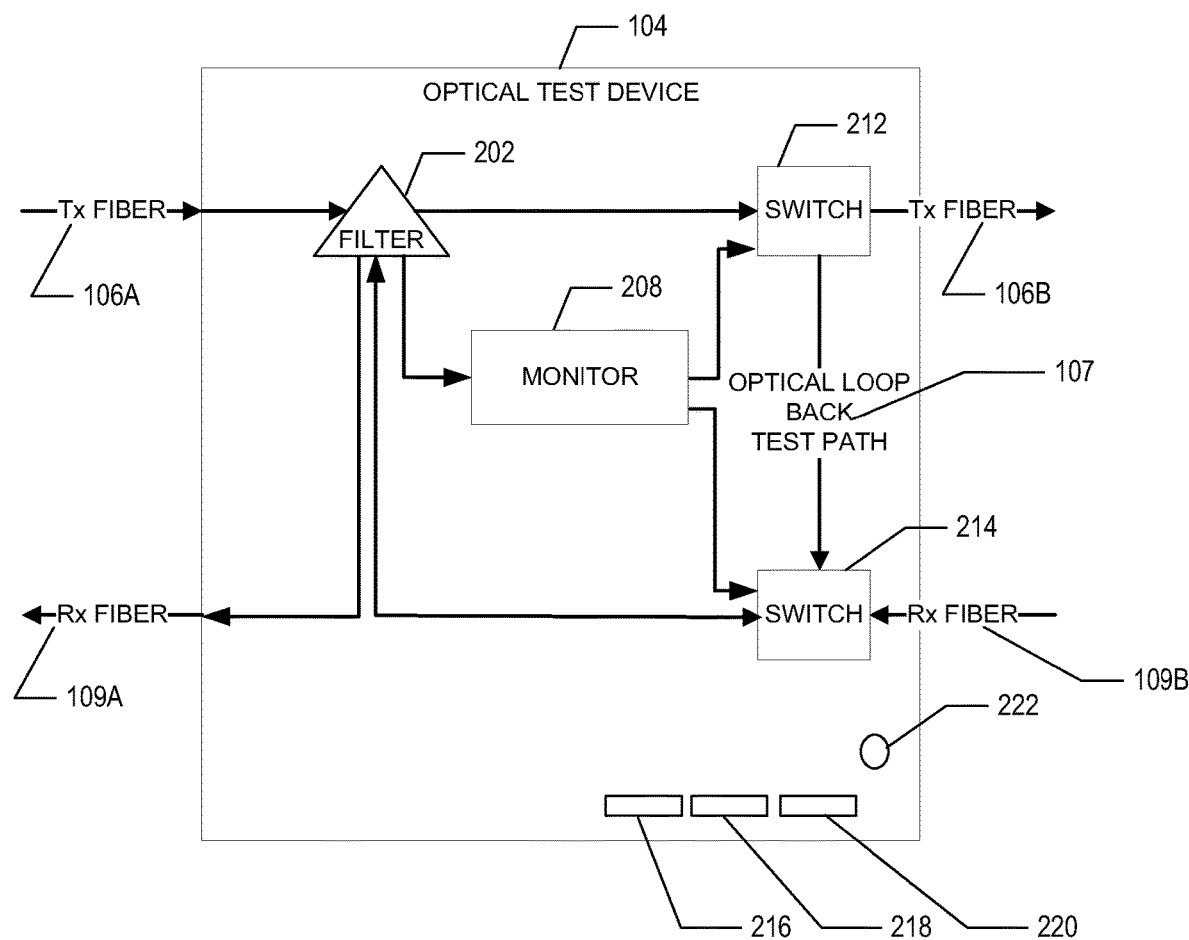
FIG. 3B is another block diagram illustrating an example of an optical test device, in accordance with an embodiment of the present disclosure.

FIG. 3 illustrates an example of an optical communication network 300 that includes a provider optical test device 310 that may be used to control or otherwise communicate with the optical test device 304. The provider optical test device may be configured to monitor signal strength on fibers connected to it, as well as enter a loop-back state for additional testing. Similarly to the systems discussed with reference to FIG. 1 and FIG. 2, in a pass through configuration, both the provider test device 310 and the optical test device 304 allow data signals on fibers 106 and 109 to pass unimpeded to and from the network provider device 302 and the customer device 308.

Thus, in one configuration of the provider optical test device 310, the transmit and receive fibers 106A and 109A are connected directly to transmit and receive fibers 106B and 109B such that optical transmissions proceed uninterrupted from the network service provider device 302 to the customer device 308. The provider optical test device 310, however, can be configured to control when optical signals pass through from the network service provider device 302 to the customer device 308 or when the device activates the optical test device 304 to monitor and test the optical fiber links. For example, the provider optical test device 310 may be configured to initiate an encoded signal on the transmission fiber 106A to cause the optical device 304 to change to a loop-back state, during which the optical device 304 loops any optical signal originating from the network service provider device 302 back to the network service provider device 302, allowing testing and monitoring of the fiber connected from the network service provider device 302 to the customer device 308.

FIGS. 4A and 4B are block diagrams illustrating two possible implementations of the provider optical test device 310. The components of the provider test device 310 may be used to change the state of the provider optical test device 310 from a default pass through state to a loop-back state, which allows a network service provider to conduct tests of optical fibers, and/or optical links. The provider optical test device 310 may include components similar to those in the optical test device 304 that may be used in conjunction with other components, such an optical switch 414 and a test laser 416 to change the state of the provider test device. For example, in one embodiment, the provider optical test device 310 includes filters 404 and 406, and monitors 408 and 410 that operate similarly to the filters 202 and 204, and the monitors 208 and monitor 210 respectively, of the optical test device 104 described above in connection with FIGS. 1 and 2. These filters and monitors may be used in conjunction with other components in the provider optical test device 310 to change the provider optical test device 310 from a pass-through state to a loop-back state.

The provider optical test device 310 may include a test laser 416 that provides an encoded signal on the transmission fiber 106 B to cause the customer test device to enter the loop-back state. The encoded signal from the test laser 416 is coupled to the transmission fiber through an optical switch 414. Optical switches enable signals in optical fibers and/or optical circuits to be selectively switched from one circuit or fiber to another.

The provider optical test device may also include a control interface 412 that provides control over the laser to initiate the encoded signal and operate the optical switch, as well as performs other operations, including running or facilitating different tests. The control interface 412 may be a hardware interface configured to exchange information with a variety of computing devices, such as a processing device, network devices, etc. The control interface may be accessed through various ways such as through a graphical user interface (GUI) or may be operated at the machine level such as through a machine-to-machine command interface, through a command and control protocol, or otherwise. Thus, any of a variety of computing, networking, and/or telecommunication devices may be configured to exchange information with the control interface 412. Alternatively, in various implementations, the control interface 412 may be implemented as instructions, modules, a software application, and/or a software interface located within the provider optical test device 310 or on an external processing device, such as a computer, a communication device, a server computer, a tablet computer, a mobile processing device, a mobile communication device and/or the like, that includes one or more processors to process software or other machine-readable instructions, a memory to store the software or other machine-readable instructions and data, and a communication system to communicate with the optical test device 104 through a wireline and/or wireless communications, such as through the Internet, an intranet, and Ethernet network, a wireline network, a wireless network, and/or another communication network. Such processing devices may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, and other data.

According to another aspect of the current disclosure, the control interface 412 may include a test suite 418. The test suite 418 represents instructions or modules capable of performing particular testing tasks or implementing particular abstract data types. In one aspect, the test suite 418 may be used in conjunction with the test laser 416 to send signals to the optical test device 104. For example, the test suite 418 may work in conjunction with the control interface 412 to cause the test data pattern to be transmitted by the test laser 416 on the transmission fiber. Further, the test suite may provide a comparison pattern to the monitors 408 and/or 410 so that the monitors can compare the test pattern as received with the comparison pattern and thereby identify the integrity of the signal at the various possible monitoring locations as well as isolate potential problems along the path whether in a loop-back configuration or not. Further, the monitor or monitors may convey the detected test pattern to the test suite 418 for monitoring and/or analysis to identify faults, disconnections, fiber continuity, and accuracy of transmission.

Figure 4:
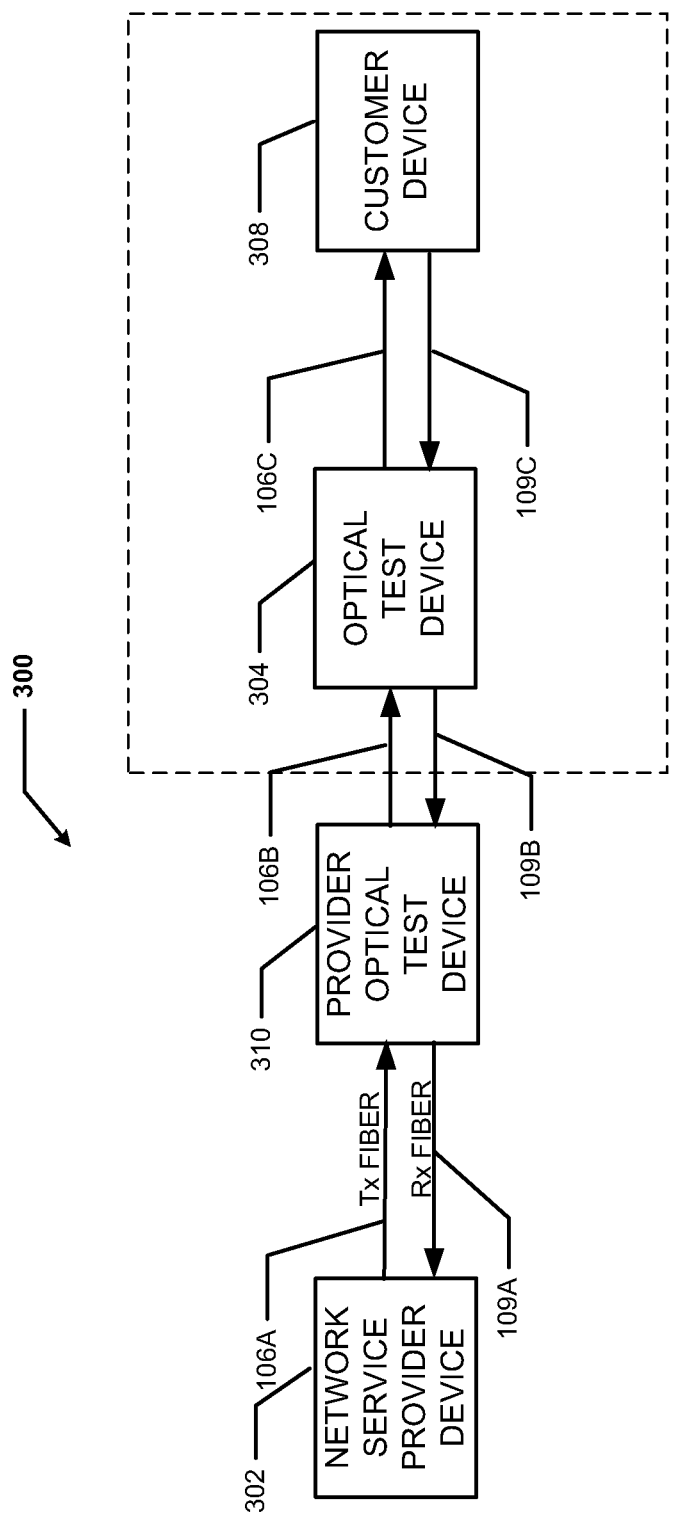
FIG. 4 is block diagram illustrating another example of an optical test device, in an optical communication network in accordance with an embodiment of the present disclosure.

While FIG. 4 includes a single optical switch and a test laser, it is contemplated that the provider optical test device 310 may be implemented using multiple test lasers and optical switches in conjunction with ports to support multiple customers. Moreover, the optical test device may further include or otherwise connect the test laser with the receive fiber 109 as well as any other fibers connected with the provider test device. Additionally, in one possible implementation as shown in FIG. 4B, the provider optical test device may only include the control interface 412, the test laser 416, and the optical switch 414.

Figure 5A:
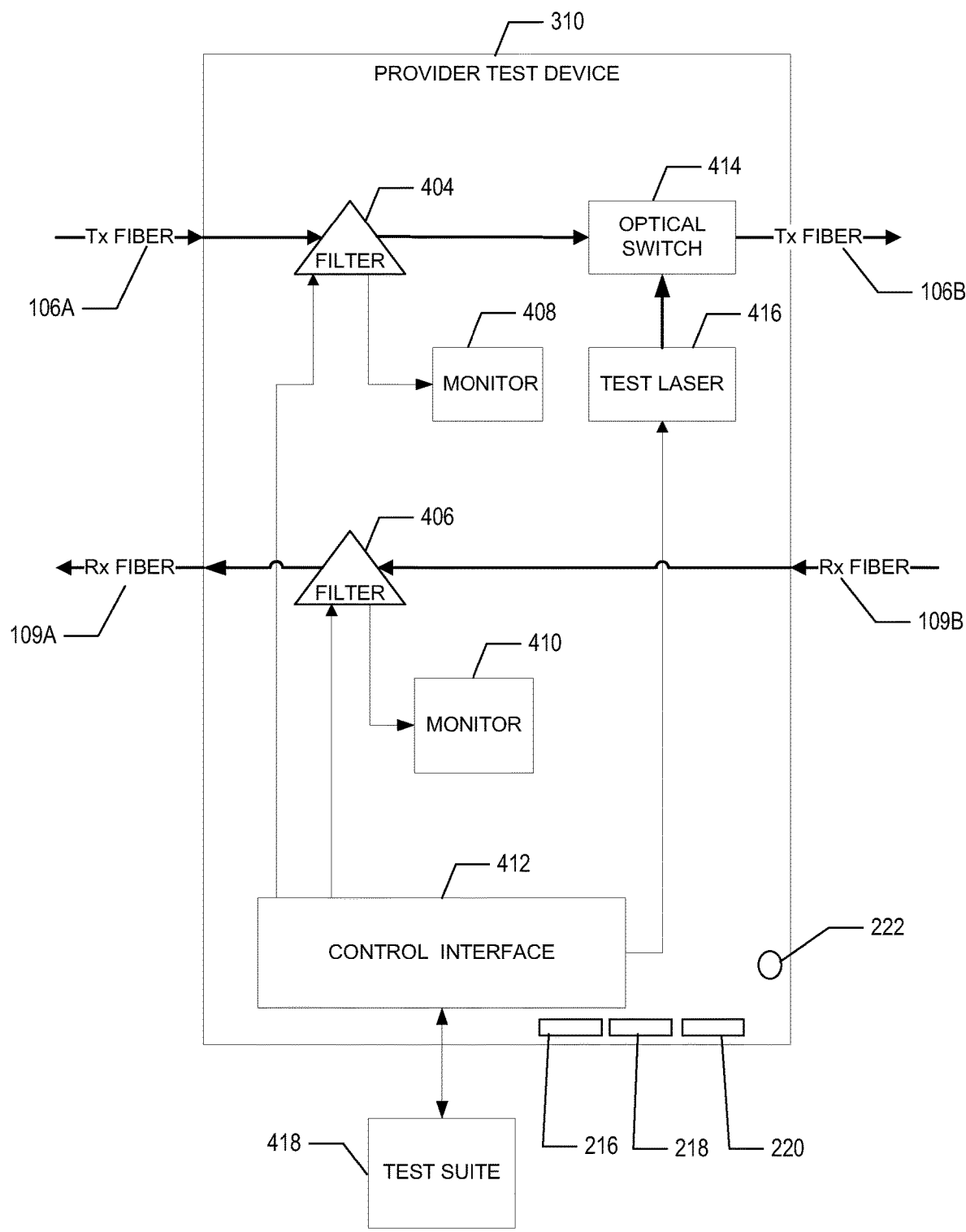
FIG. 5A is a block diagram illustrating an example of a provider optical test device in an optical communication network, in accordance with an embodiment of the present disclosure.
Figure 5B:
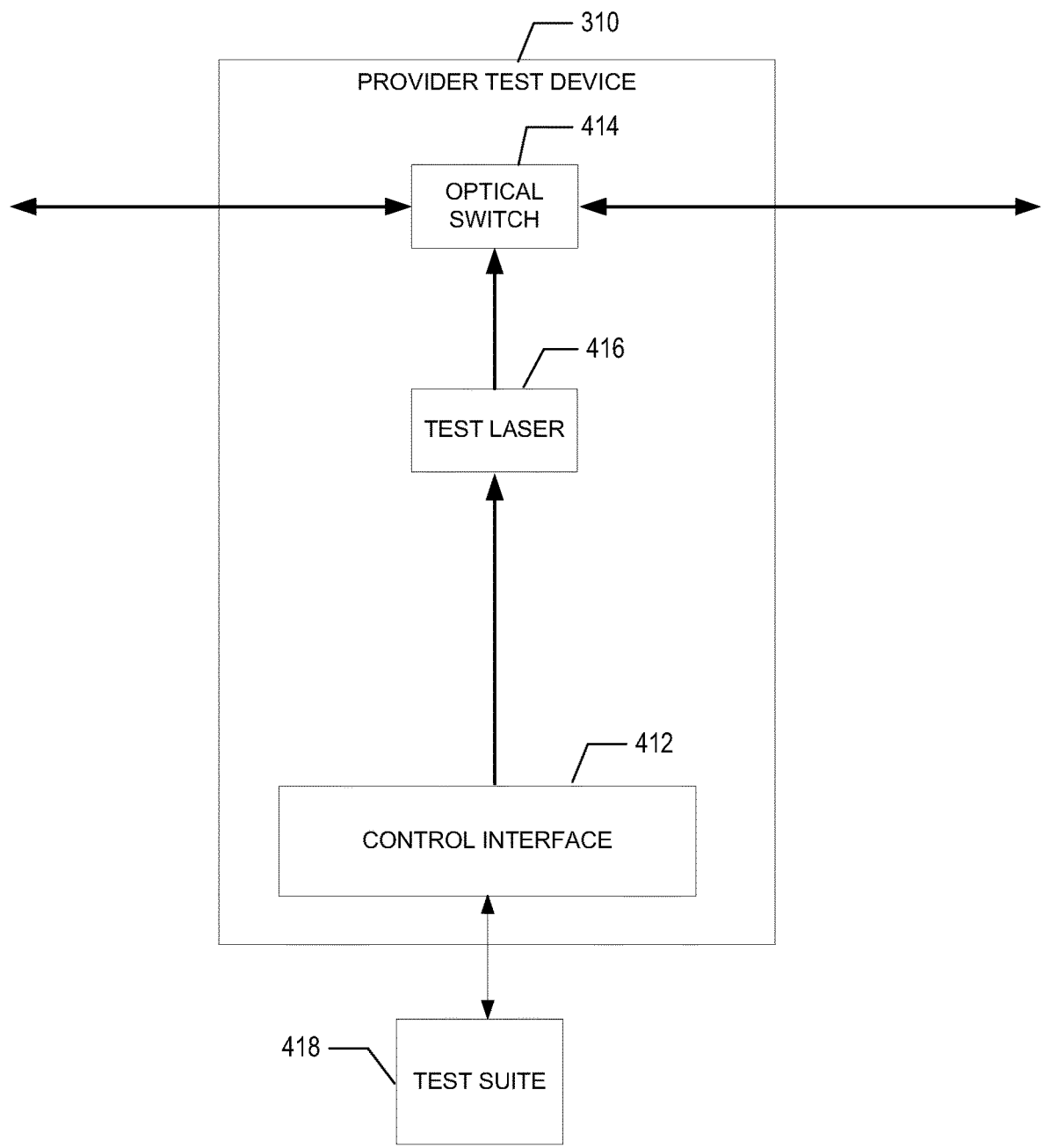
FIG. 5B is another block diagram illustrating an example provider optical test device, in accordance with an embodiment of the present disclosure.
Figure 6:
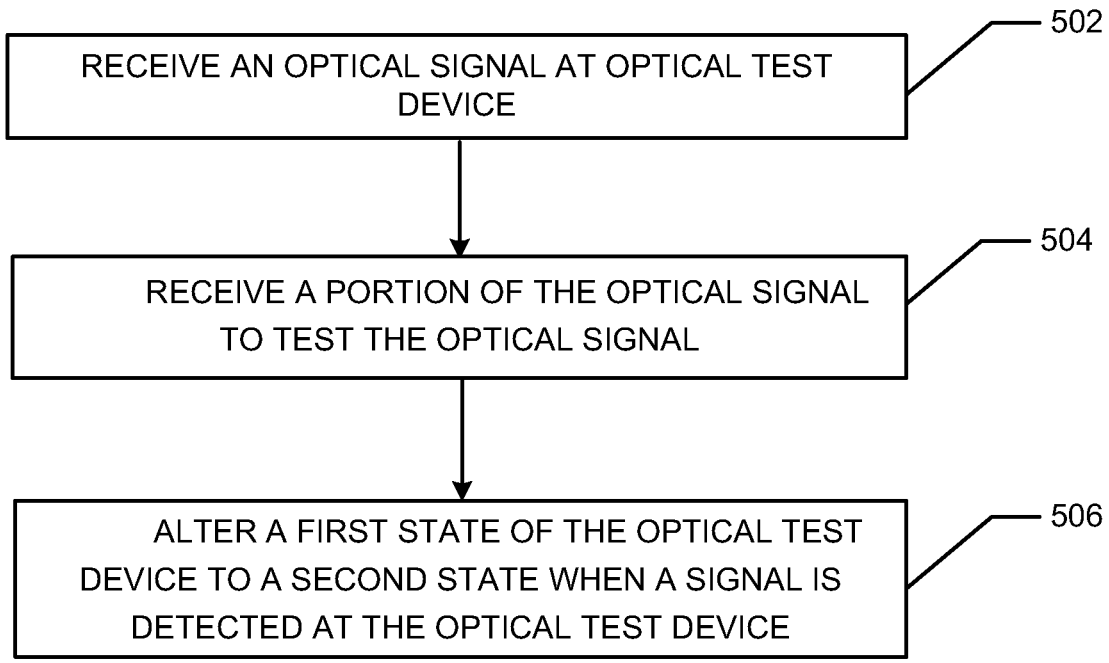
FIG. 6 is a method diagram illustrating an example method for monitoring an optical network, in accordance with an embodiment of the present disclosure.

FIG. 5 is a flow chart illustrating an example of a method for monitoring optical signals and services on an optical network. To begin, at operation 502, an optical signal is received at a test device. For example, an optical signal is transmitted over Tx fiber 106 and received by the optical test device 104. A portion of the optical signal is received to test the optical signal at 504. For example, the optical signal received at the optical test device 104 may be filtered by the filter 202 resulting in a portion of the optical signal being transmitted to the monitor 208 for testing, such as testing the power level of the portion of the optical signal. When the power level is above a certain threshold the optical signal is valid. At 506, the test device is switched from a first state to a second state when a signal is detected. For example, an encoded signal represented by a predefined series of bits may be detected by the monitor 208 indicating that the optical test device 104 should change from a pass-through state to a loop-back state. Accordingly, the monitor 208 causes the switches 210 and 212 in the optical test device 104 to be toggled from first position resulting in a pass-through state to second positions resulting a loop-back state. While in the loop-back state, the optical test device 104 loops any optical signals originating from the network service provider device 102 for transmission to the customer device 108, back to the network service provider device 102. Once in a loop-back state the network provider may perform various tests to on optical signal sent to the optical test device 104, or any optical fibers connected to the optical test device 104.

Figure 7:
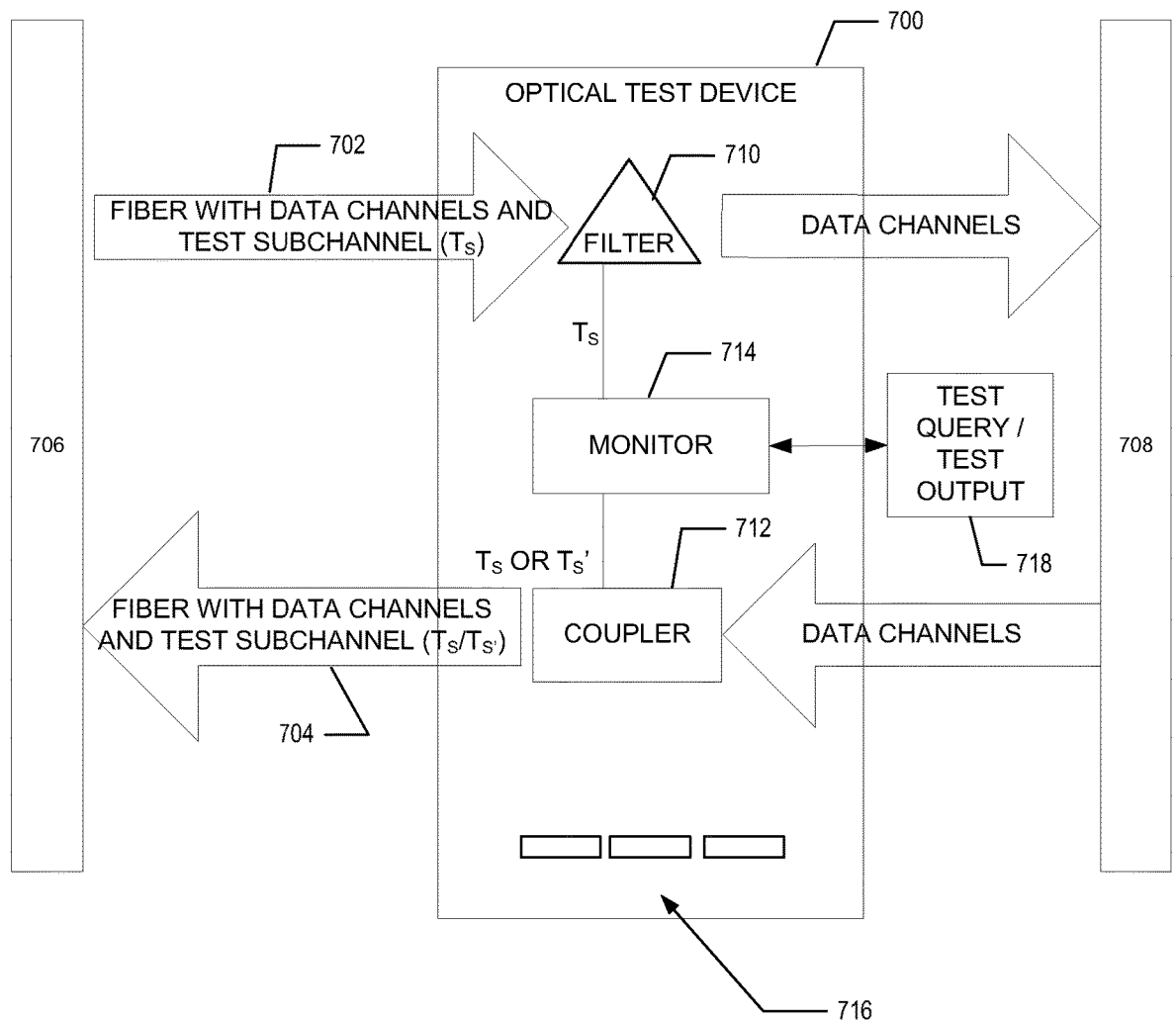
FIG. 7 is a block diagram of another example optical test device, in accordance with an embodiment of the present disclosure.

FIG. 7 is another alternative embodiment of an optical test device 700. The various features discussed and shown in FIG. 7 may be used in conjunction with various other embodiments discussed herein and similarly features discussed in other embodiments may be used in conjunction with features discussed with reference to FIG. 7. The device of FIG. 7 employs a dedicated test subchannel (Ts) with a test signal carried on a fiber 702 between a first device 706 and the optical test device 700. The test signal may be a particular wavelength different from wavelengths (or channels) carrying data. So, for example, if the optical fiber can carry 40 wavelengths (channels) of data, then some or all of one particular channel is used for testing the transmit and/or receive fibers (waveguides) between the first device, which may be a network service provider device or a gateway, and a second device 708, which may be customer device or otherwise between two devices. Further, the test device 700 does not include switches to create the loop-back path like some of the other embodiments discussed herein. Rather, an optical filter 710 is provided in the transmission path and the filter separates the test subchannel (Ts) from the data channels. A coupling element 712 in the return path adds the subchannel signal to the data channels for return to the originating device (e.g., the network provider device) using a return fiber 704.

A monitor 714 or other testing component is placed in the subchannel path, which may be between the filter 710 and coupling element 712. The monitor may be configured to test and report various characteristics of the subchannel signal, such as power, attenuation and the like. Further, the monitor may automatically report the test data by way of a network connection 718. Alternatively or in addition, the monitor may be configured to receive a query or other request from a user through a connection 718 to the monitor, and return the test data to the user. In one example, the subchannel signal (Ts) is returned to the network provider device and may be tested and/or monitored a second time at the network provider. Thus, the optical test device may be used to detect and report signal and connection issues in the transmission path to the customer equipment. Also, by adding the test signal back into the receive line, the return path from the customer equipment to the network equipment may also be tested. In this embodiment, the test signal can always be present and is separate from the data channels so a switch that causes loop back testing is not used.

The monitor may also embed test data into the test channel rather than or in addition to providing a separate mechanism to query or obtain test results from the monitor. Thus, after the monitor analyzes the test signal (Ts), the results of the analysis are included in the test signal as Ts'. At the network service provider such as by using a provider test device as shown in FIG. 5A, the test information may be extracted from the test channel by monitor 410. Additionally, the monitor 410 may also separately test the integrity of the test signal to determine if there are any issues in the Rx Fiber between the customer equipment and the network provider equipment.

Figure 8:
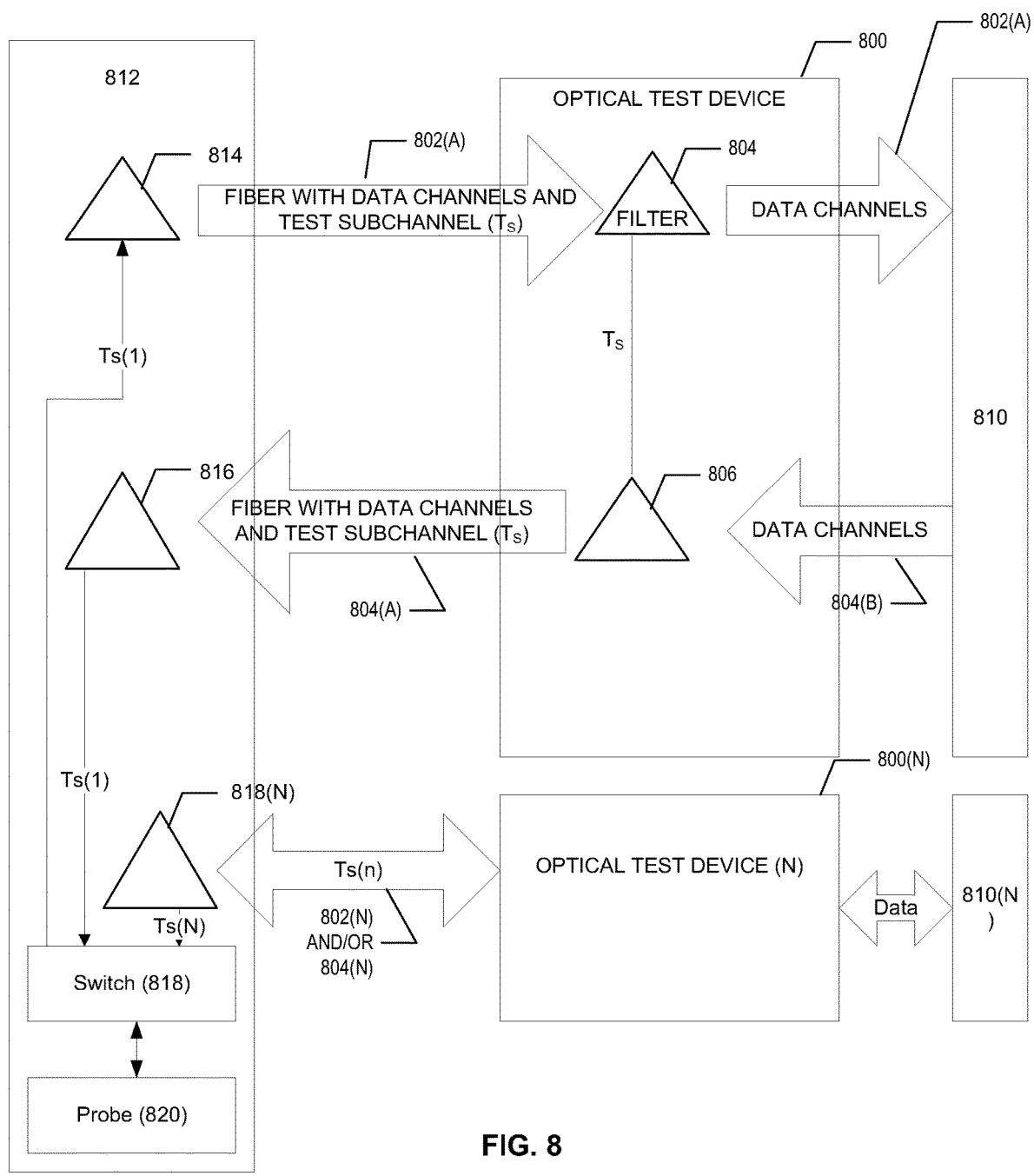
FIG. 8 is another block diagram of an example optical test device.

FIG. 8 illustrates another alternative implementation of an optical test device 800 operating in a testing system taking advantage of the device and including some monitoring features at a first device 812, which may be a service provider device such as a gateway. More particularly, an optical test device 800 is coupled between a transmission fiber 802, which originates at the first device, and a second device 810, which may be a customer device. Data signals on the transmission fiber are configured to pass through a filter 804 to the customer device. Thus, the transmission fiber 802 may pass through the optical test device to the customer device or the transmission fiber 802(A) may be optically connected to the optical test device and a second transmission fiber 802(B) connected between the test device and the customer device. Similarly, a receive fiber or fibers 802(A), (B) provide a return data path from the second device (e.g., customer equipment) 810 through the optical test device and to the first device (e.g., network provider equipment). The transmission fiber, similarly to the embodiment discussed with regard to FIG. 7, includes a test subchannel (Ts) that may occupy some or all of one of the wavelengths carried on the fiber. The filter 804 extracts the subchannel and the signal carried thereon (Ts) and loops it back to the provider device by way of a second filter 806 and the return fiber 804(A).

In this embodiment, monitoring of the subchannel and any test signal thereon, is performed at the first device. A test signal may continuously or intermittently occupy one or more transmission fibers from the first device or the test signal may be optically coupled to the transmission fiber at an optical coupling element 814. In the latter case, the test signal is generated and switched on the transmission fiber by way of a switch 818 that receives the test signal from a probe 820. The probe may also include similar features and/or functions as shown in FIG. 5A and discussed relative to elements 412, 418 and/or 416.

The switch and probe may also receive and monitor the test signal returning on the receive fiber 804(A). In this example, a filter extracts the test signal and provides the signal to the probe 820. The switch allows the system to receive and test signals from one or many return fibers connected with the first device 812. Thus, for example, optical test devices 800N may be connected to various customer devices and provide a test signal loop back path to and from a gateway. The switch 818, at the gateway, is connected with a plurality of filters 816 and 818 (N) receiving test signals from a corresponding plurality of test devices. The switch, which may be a multiplexor, is configured, such as with a select line, to couple the test signal Ts(N) from a selected receive fiber 804(N) to the probe 820 to test the transmission and/or receive fibers and/or the signal quality thereon.

Thus, embodiments, in accordance with aspects of the present disclosure, an optical test device is used to test and monitor optical signals and optical network services provided by an optical network service provider without having to install expensive physical equipment at customer's remote location.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
 receiving an optical signal at an optical test device, the optical test device comprising at least one monitoring device and a first switch;
 receiving, at the monitoring device, a portion of the optical signal;
 detecting a power level of the portion of the optical signal and comparing the detected power level of the portion of the optical signal with a threshold power level to determine if the optical signal is valid or invalid;
 detecting, when the detected power level indicates that the optical signal is invalid, a control signal within the optical signal, the control signal used to control the status of the optical test device; and
 altering the state of the optical test device from a first state to a second state when the control signal is detected at the optical test device.

2. The method of claim 1, wherein altering the state of the optical test device comprises toggling the first switch from a first position to a second position to alter the state of the optical test device from the first state to the second state when the control signal is detected.

3. The method of claim 2, wherein the control signal is an encoded signal in the optical signal.

4. The method of claim 3, wherein the encoded signal is a predetermined series of bits.

5. The method of claim 2, further comprising altering the state of the optical test device to a pass-through state when the optical test device fails.

6. The method of claim 2, wherein the first state is a pass-through state and the second state is a loop-back state.

7. An optical test device comprising:
 at least one optical filter coupled with a first optical fiber, the at least one first optical filter configured to allow an optical signal on the first optical fiber to pass from the first optical fiber to a second optical fiber;
 at least one monitoring device coupled with the at least one optical filter, the at least one monitoring device configured to receive a portion of the optical signal to test the optical signal by measuring power of the portion of the optical signal and determining whether the power is above a first threshold;
 a first switch in communication with the first optical fiber, the first switch configured to switch the optical signal on the first optical fiber to a third optical fiber for loop-back testing; and
 wherein the monitoring device is further configured to detect a control signal and toggle the first switch to switch the optical signal on the first optical fiber to the third optical fiber when the control signal is detected.

8. The optical device of claim 7, wherein the first switch is interposed between the first optical fiber and the second optical fiber and allows the optical signal to pass from the first optical fiber to the second optical fiber in a first state and switches the optical signal to the third optical fiber for loop-back testing.

9. The optical test device of claim 7, further comprising a second switch interposed between a fourth optical fiber and the third optical fiber, the second optical switch further configured to receive the optical signal from the first switch and couple the optical signal with the third optical fiber for loop-back testing.

10. The optical test device of claim 9, wherein the first optical fiber and the third optical fiber are coupled with a network provider device, and wherein the second optical fiber and the fourth optical fiber are coupled with a customer network device.

11. The optical test device of claim 7, further comprising a manual loop-back button and wherein the manual loop-back button is configured to provide the control signal.

12. The optical test device of claim 7, wherein the control signal is an encoded signal in the optical signal.

13. The optical test device of claim 12, wherein the encoded signal is a predetermined series of bits.

14. An optical filter test system comprising:
 an optical test device comprising:
  at least one optical filter coupled with a first optical fiber, the at least one first optical filter configured to allow an optical signal on the first optical fiber to pass from the first optical fiber to a second optical fiber;
  at least one monitoring device coupled with the at least one optical filter, the at least one monitoring device configured to measure power of a portion of the optical signal and determine whether the power is above a first threshold and to detect a control signal; and
  a first switch in communication with the first optical fiber, the first switch configured to switch the optical signal on the first optical fiber to a third optical fiber for loop-back testing when the control signal is detected; and
 an optical device to provide the control signal to the optical test device.

15. The system of claim 14, wherein the first switch is interposed between the first optical fiber and the second optical fiber and allows the optical signal to pass from the first optical fiber to the second optical fiber in a first state and switches the optical signal to the third optical fiber for loop-back testing.

16. The system of claim 14, wherein the optical test device further comprises a second switch interposed between a fourth optical fiber and the third optical fiber, the second optical switch further configured to receive the optical signal from the first switch and couple the optical signal with the third optical fiber for loop-back testing.

17. The system of claim 14, wherein the first optical fiber and the third optical fiber are coupled with a network provider device, and wherein the second optical fiber and the fourth optical fiber are coupled with a customer network device.

18. The system of claim 14, wherein the control signal is an encoded signal in the portion of the optical signal.

19. The system of claim 18, wherein the encoded signal is a predetermined series of bits.

20. The system of claim 14, wherein the optical device is a customer device.

* * * * *